United States Patent
Miloskovska et al.

(10) Patent No.: US 12,391,802 B2
(45) Date of Patent: Aug. 19, 2025

(54) METHOD OF FORMING SEMICRYSTALLINE POLYETHERIMIDE, AND POLYETHERIMIDE-CONTAINING COMPOSITION

(71) Applicant: SHPP GLOBAL TECHNOLOGIES B.V., Bergen op Zoom (NL)

(72) Inventors: Elena Miloskovska, Breda (NL); Bruke Daniel Jofore, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 682 days.

(21) Appl. No.: 17/436,248

(22) PCT Filed: May 7, 2020

(86) PCT No.: PCT/IB2020/054331
§ 371 (c)(1),
(2) Date: Sep. 3, 2021

(87) PCT Pub. No.: WO2020/234683
PCT Pub. Date: Nov. 26, 2020

(65) Prior Publication Data
US 2022/0162387 A1    May 26, 2022

(30) Foreign Application Priority Data
May 23, 2019    (EP) .................................... 19176129

(51) Int. Cl.
*C08G 73/10* (2006.01)
*C08J 3/00* (2006.01)
*C08J 3/09* (2006.01)
*C08J 3/11* (2006.01)

(52) U.S. Cl.
CPC .......... *C08G 73/1071* (2013.01); *C08J 3/095* (2013.01); *C08G 2250/00* (2013.01); *C08J 2379/08* (2013.01)

(58) Field of Classification Search
None
See application file for complete search history.

(56) References Cited

U.S. PATENT DOCUMENTS

| | | | |
|---|---|---|---|
| 4,629,745 A * | 12/1986 | Hoki ........................ | C08J 9/142 521/184 |
| 5,047,487 A * | 9/1991 | Camargo ................ | C08L 79/08 525/425 |
| 7,084,232 B2 | 8/2006 | Kim et al. | |
| 2005/0215758 A1 | 9/2005 | Kim et al. | |
| 2009/0029615 A1 | 1/2009 | Susarla et al. | |
| 2012/0245239 A1 | 9/2012 | Kalyanaraman et al. | |
| 2014/0275365 A1 | 9/2014 | Kalayaraman et al. | |
| 2015/0337461 A1 | 11/2015 | Bansal et al. | |
| 2018/0244863 A1 | 8/2018 | Leenders | |
| 2020/0140706 A1 * | 5/2020 | Pfister .................... | B33Y 10/00 |

FOREIGN PATENT DOCUMENTS

| | | |
|---|---|---|
| JP | H0111864 A | 5/1989 |
| WO | 2015157148 A1 | 10/2015 |
| WO | 2016209870 A1 | 12/2016 |
| WO | 2018119409 A1 | 6/2018 |
| WO | WO-2018197577 A1 * | 11/2018 ........... B29C 64/153 |

OTHER PUBLICATIONS

Desper et al., "Transient Crystallization of an Aromatic Polyimide: Effect of Annealing," U.S. Army Report AD-A231 988, Jan. 1991 (24 pgs).
Ferrara, et al., "Characterization of Solvent Induced Crystallization Using Simultaneous Thermal Analysis (STA)," Annual Technical Conference—Society of Plastics Engineers 1995, vol. 53, issue 2 (5 pgs).
Hsieh et al., "Transient crystallization of an aromatic polyetherimide: effect of annealing" Polymer, 1992, vol. 33, No. 2, pp. 306-313.
Hwang et al., "Solvent Induced Crystallization of Polycarbonate in Mixed Solvent," Polymer (Korea) 2001, vol. 25, No. 6 (English abstract, 7pgs.).
International Search Report mailed Aug. 25, 2020; International Application No. PCT/IB2020/054331; International Filing Date May 7, 2020 (6 pgs).
Koning, et al., "Synthesis and properties of a,w-diaminoalkane based polyimides," Polymer 1994, vol. 35, No. 22 (pp. 4889-4895).
Nelson, et al., "Solvent-Induced Crystallization in Polyetherimide Thermoplastics and Their Carbon Fiber Composites," Journal of Applied Polymer Science 1991, vol. 42, Issue 5 (8 pgs).
Pratt et al., "A Study of Thermal Transitions in a New Semicrystalline Thermoplastic Polyimide," NASA Technical Memorandum 101526, 1988 (34 pgs).
Wang et al., "Solvent-induced crystallization of aromatic polyimide" Polymer, 1989, vol. 30, April (pp. 718-721).
Written Opinion mailed Aug. 25, 2020; International Application No. PCT/IB2020/054331; International Filing Date May 7, 2020 (11 pgs).

* cited by examiner

Primary Examiner — Ha S Nguyen
(74) Attorney, Agent, or Firm — CANTOR COLBURN LLP

(57) ABSTRACT

In a method of forming a semicrystalline polyetherimide, a solvent mixture is combined with an amorphous polyetherimide in a weight ratio of 1:1 to 50:1, respectively, to form a first dispersion. The solvent mixture includes dichloromethane and a $C_1$-$C_6$ alkanol in a weight ratio of 0.5:1 to 15:1, respectively. The first dispersion is agitated to form a second dispersion containing a semicrystalline polyetherimide, and the semicrystalline polyetherimide is isolated from the second dispersion. The isolated semicrystalline polyetherimide exhibits a melting point in a range of 230 to 300° C. Also described is a composition that includes a polyetherimide, dichloromethane, and a $C_1$-$C_6$ alkanol in specific ratios.

13 Claims, No Drawings

METHOD OF FORMING SEMICRYSTALLINE POLYETHERIMIDE, AND POLYETHERIMIDE-CONTAINING COMPOSITION

CROSS-REFERENCE TO RELATED APPLICATIONS

This application is a National Stage application of PCT/IB2020/054331, filed May 7, 2020, which claims the benefit of European Application No. 19176129.5, filed May 23, 2019, both of which are incorporated by reference herein in their entirety.

BACKGROUND OF THE INVENTION

Polyetherimides are high-performance polymers exhibiting a desirable combination of heat resistance, chemical resistance, and mechanical strength. As commercially supplied, polyetherimides are amorphous polymers, lacking any crystallinity. For this reason, they cannot be used in applications that require a semicrystalline polymer. Such applications include, for example, the selective laser sintering and jet fusion methods of additive manufacturing.

It is known to form a semicrystalline polyetherimide by synthesizing the polyetherimide in ortho-dichlorobenzene. See, e.g., International Patent Application Publication Number WO 2016/209870 A1 of Kalyanaraman et al., published 29 Dec. 2016, paragraphs [0064]-[0065]. However, reducing the amount of residual ortho-dichlorobenzene in semicrystalline polyetherimide produced by this method requires relatively high temperatures (e.g., 200° C.) and long times (e.g., one week). It is also known to form semicrystalline polyetherimide by "soaking" an amorphous polyetherimide powder in dichloromethane. See, e.g., International Patent Application Publication Number WO 2018/119409 A1 of Price et al., published 28 Jun. 2018, paragraph [00113]. But, as demonstrated in the working examples below, difficulties associated with this method include agglomeration of polyetherimide particles in dichloromethane, and formation of a hard solid during filtration of the product semicrystalline polyetherimide.

There remains a need for a method of forming semicrystalline polyetherimide that avoids the use of high-boiling solvents and the formation of agglomerated solids.

BRIEF SUMMARY OF EMBODIMENTS OF THE INVENTION

One embodiment is a method of forming a semicrystalline polyetherimide, comprising: combining a solvent mixture with an amorphous polyetherimide in a weight ratio of 1:1 to 50:1, respectively, to form a first dispersion; wherein the solvent mixture comprises dichloromethane and a $C_1$-$C_6$ alkanol in a weight ratio of 0.5:1 to 15:1, respectively; and wherein the amorphous polyetherimide comprises etherimide units having the structure

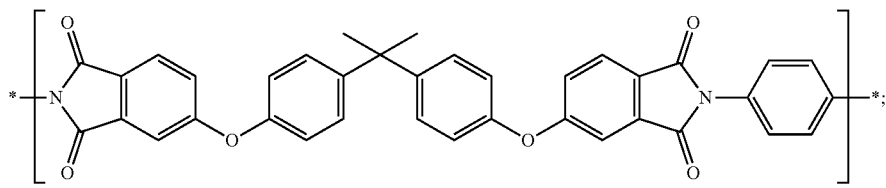

agitating the first dispersion for a time of 5 to 500 minutes and at a temperature of 10 to 50° C. to form a second dispersion comprising a semicrystalline polyetherimide; and isolating the semicrystalline polyetherimide from the second dispersion; wherein the isolated semicrystalline polyetherimide exhibits a melting point in a range of 230 to 300° C., determined according to ASTM D3418-15 by differential scanning calorimetry using a heating rate of 20° C./minute.

Another embodiment is a composition comprising: a polyetherimide comprising etherimide units having the structure

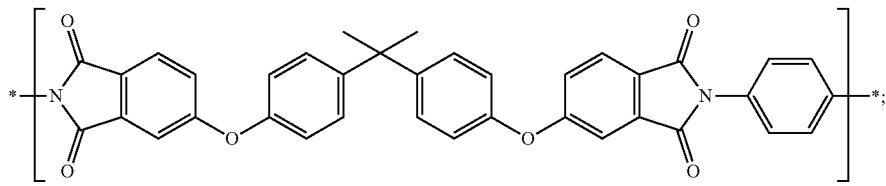

and a solvent mixture comprising dichloromethane and a $C_1$-$C_6$ alkanol; wherein the composition comprises the solvent mixture and the amorphous polyetherimide in a weight ratio of 1:1 to 50:1, respectively; and wherein the solvent mixture comprises the dichloromethane and the $C_1$-$C_6$ alkanol in a weight ratio of 0.5:1 to 15:1, respectively.

These and other embodiments are described in detail below.

DETAILED DESCRIPTION OF THE INVENTION

The present inventors have determined that semicrystalline polyetherimide having a specific chemical structure is readily formed and isolated in a method that includes solvent-induced crystallization of the corresponding amorphous polyetherimide in a solvent mixture comprising specific amounts of dichloromethane and a $C_1$-$C_6$ alkanol. Relative to solvent-induced crystallization in ortho-dichlorobenzene, the method allows for crystallization at lower temperature, and more facile removal of residual solvent from the product semicrystalline polyetherimide. Relative to solvent-induced crystallization in dichloromethane alone, the method avoids particle agglomeration during crystallization and produces a higher yield of semicrystalline polyetherimide.

One embodiment is a method of forming a semicrystalline polyetherimide, comprising: combining a solvent mixture with an amorphous polyetherimide in a weight ratio of 1:1 to 50:1, respectively, to form a first dispersion; wherein the solvent mixture comprises dichloromethane and a $C_1$-$C_6$ alkanol in a weight ratio of 0.5:1 to 15:1, respectively; and wherein the amorphous polyetherimide comprises etherimide units having the structure

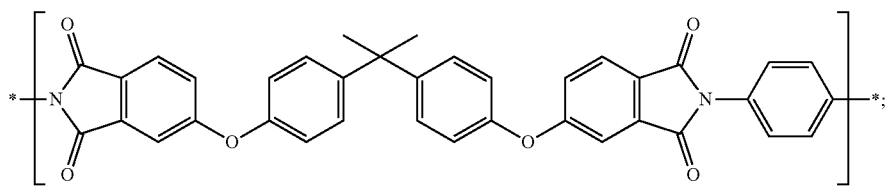

agitating the first dispersion for a time of 5 to 500 minutes and at a temperature of 10 to 50° C. to form a second dispersion comprising a semicrystalline polyetherimide; and isolating the semicrystalline polyetherimide from the second dispersion; wherein the isolated semicrystalline polyetherimide exhibits a melting point in a range of 230 to 300° C., determined according to ASTM D3418-15 by differential scanning calorimetry using a heating rate of 20° C./minute.

The polymeric starting material for the method is an amorphous polyetherimide. As used herein, the term "amorphous polyetherimide" refers to a polyetherimide exhibiting a glass transition temperature in a range of 200 to 225° C., but not exhibiting a melting point in a range of 230 to 300° C. The presence of a glass transition temperature and the absence of a melting point are determined according to ASTM D3418-15 by differential scanning calorimetry using a heating rate of 20° C./minute.

The amorphous polyetherimide comprises etherimide units having the structure

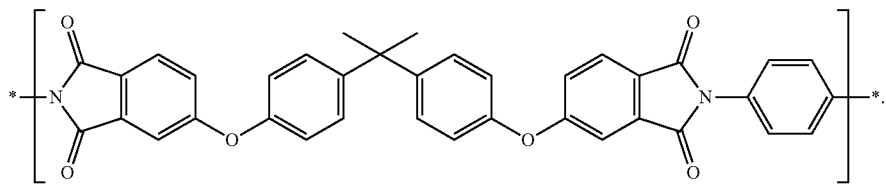

In some embodiments, the amorphous polyetherimide comprises, based on the weight of the amorphous polyetherimide, at least 95 weight percent of the etherimide units having the structure above. Conversely, in these embodiments, the amorphous polyetherimide comprises, based on the weight of the amorphous polyetherimide, 0 to 5 weight percent of etherimide units having a structure different from that above. As one example, in these embodiments, the amorphous polyetherimide comprises, based on the weight of the amorphous polyetherimide, 0 to 5 weight percent of etherimide units having the structure

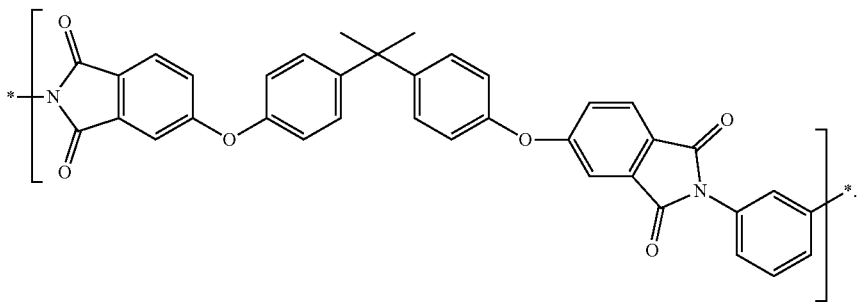

There is no particular limit on the end groups of the amorphous polyetherimide. Suitable end groups include, for example, those derived from monoanhydrides, such as phthalic anhydride, and those derived from monoamines, such as aniline. The number of etherimide units in the amorphous polyetherimide can be, for example, 10 to 1,000, or 20 to 500. Methods of making polyetherimides comprising etherimide units having the structure

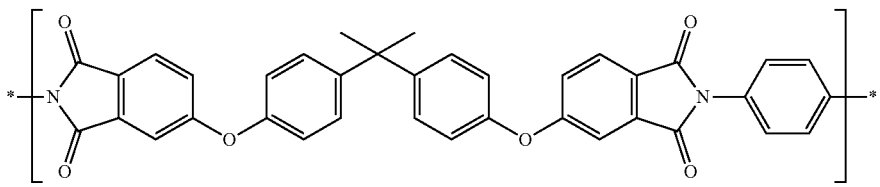

include those described in U.S. Patent Application Publication Numbers US 2009/0029615 A1 of Susarla et al., and US 2015/0337461 A1 of Bansal et al. Such polyetherimides are also commercially available from SABIC as ULTEM™ CRS 5000 series resins, including ULTEM™ Resin CRS 5001, ULTEM™ Resin CRS 5011, and ULTEM™ Resin CRS 5111.

When the semicrystalline polyetherimide is intended to be used in an application requiring a powder, for example selective laser sintering or jet fusion, then the amorphous polyetherimide starting material is preferably also in the form of a powder. For example, in some embodiments the amorphous polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009. In some embodiments, Dv50 is in a range of 10 to 200 micrometers, or in a range of 10 to 100 micrometers, or in a range of 30 to 95 micrometers, or in a range of 40 to 90 micrometers. Mastersizer™ particle size analyzers from Malvern Instruments are suitable laser diffraction instruments for determining particle size characteristics according to ISO 13320:2009.

In the method, a solvent mixture is combined with the amorphous polyetherimide in a weight ratio of 1:1 to 50:1, respectively, to form a first dispersion. Within the range of 1:1 to 50:1, the weight ratio of the solvent mixture to the amorphous polyetherimide can be 2:1 to 20:1, or 2.5:1 to 15:1. The solvent mixture comprises dichloromethane and a $C_1$-$C_6$ alkanol in a weight ratio of 0.5:1 to 15:1. Within the range of 0.5:1 to 15:1, the weight ratio of dichloromethane to $C_1$-$C_6$ alkanol can be 1:1 to 10:1, or 1.5:1 to 5:1. The term "$C_1$-$C_6$ alkanol" refers to an aliphatic monoalcohol having one, two, three, four, five, or six carbon atoms. When the alkanol contains three to six carbon atoms, the alkanol can be straight-chain, branched, cyclic, or a combination of at least two of the foregoing.

$C_1$-$C_6$ alkanols include, for example, methanol, ethanol, propan-1-ol (n-propanol), propan-2-ol (isopropanol), cyclopropanol, butan-1-ol, butan-2-ol, 2-methylpropan-1-ol, 2-methylpropan-2-ol, 1-methylcyclopropanol, 2-methylcyclopropanol, cyclopropylmethanol, cyclobutanol, pentan-1-ol, pentan-2-ol, pentan-3-ol, 3-methylbutan-1-ol, 3-methylbutan-2-ol, 2-methylbutan-2-ol, 2-methylbutan-1-ol, 2,2-dimethylpropan-1-ol, cyclopentanol, cyclobutylmethanol, 1-methylcyclobutanol, 2-methylcyclobutanol, 3-methylcyclobutanol, 2-cyclopropylethanol, 1-cyclopropylethanol, 1-ethylcyclopropanol, 2-ethylcyclopropanol, (1-methylcyclopropyl)methanol, 2,2-dimethylcyclopropanol, (2-methylcyclopropyl)methanol, 1,2-dimethylcyclopropanol, 2,3-dimethylcyclopropanol, hexan-1-ol, hexan-2-ol, hexan-3-ol, 1-methylpentan-1-ol, 4-methylpentan-1-ol, 4-methylpentan-2-ol, 2-methylpentan-2-ol, 2-methylpentan-3-ol, 2-methylpentan-1-ol, 3-methylpentan-1-ol, 3-methylpentan-2-ol, 3-methylpentan-3-ol, 3,3-dimethylbutan-1-ol, 3,3-dimethylbutan-2-ol, 2,2-dimethylbutan-1-ol, 2,3-dimethylbutan-1-ol, 2,3-dimethylbutan-2-ol, cyclohexanol, cyclopentylmethanol, 1-methylcyclopentanol, 2-methylcyclopentanol, 3-methylcyclopentanol, (1-methylcyclobutyl)methanol, 2,2-dimethylcyclobutanol, 3,3-dimethylcyclobutanol, (2-methylcyclobutyl)methanol, 2,3-dimethylcyclobutanol, 1,2-dimethylcyclobutanol, (3-methylcyclobutyl)methanol, 1,3-dimethylcyclobutanol, 2,4-dimethylcyclobutanol, 1-cyclobutylethanol, 2-cyclobutylethanol, 1-ethylcyclobutanol, 2-ethylcyclobutanol, 3-ethylcyclobutanol, 3-cyclopropylpropan-1-ol, 1-cyclopropylpropan-2-ol, 1-cyclopropylpropan-1-ol, 1-propylcyclopropanol, 2-propylcyclopropanol, 2-cyclopropylpropan-1-ol, 1-methyl-1-cyclopropylethanol, 1-(2-propyl)cyclopropanol, 2-(2-propyl)cyclopropanol, 1-(2-methylcyclopropyl)ethanol, 2-(2-methylcyclopropyl)ethanol, 1-ethyl-2-methylcyclopropanol, (2-ethylcyclopropyl)methanol, 1-methyl-2-ethylcyclopropanol, and combinations thereof.

In some embodiments, the $C_1$-$C_6$ alkanol is selected from the group consisting of methanol, ethanol, isopropanol, and combinations thereof. In other embodiments, the $C_1$-$C_6$ alkanol is selected from the group consisting of methanol, ethanol, and combinations thereof. In still other embodiments, the $C_1$-$C_6$ alkanol comprises methanol. In some embodiments, the dichloromethane and the $C_1$-$C_6$ alkanol collectively constitute 90 to 100 weight percent of the solvent mixture, or 95 to 100 weight percent of the solvent mixture, or 100 weight percent of the solvent mixture.

After the solvent mixture and the amorphous polyetherimide are combined to form the first dispersion, the first dispersion is agitated for a time of 5 to 500 minutes and at a temperature of 10 to 50° C. to form a second dispersion comprising a semicrystalline polyetherimide. There is no particular limit on the type of agitation employed. An example of suitable agitation is agitation by rotary stirrer operating at 100 to 5,000 rotations per minute, or 1,000 to 5,000 rotations per minute, or 1,500 to 5,000 rotations per minute. Within the range of 5 to 500 minutes, the time of agitation can be 10 to 200 minutes, or 20 to 150 minutes. Within the range of 10 to 50° C., the temperature during agitation can be 15 to 40° C. In some embodiments, agitating is conducted for a time of 10 to 200 minutes and at a temperature of 15 to 40° C.

Agitation of the first dispersion yields a second dispersion comprising a semicrystalline polyetherimide. As used herein, the term "semicrystalline polyetherimide" refers to a polyetherimide exhibiting a melting point. As a practical matter, the semicrystalline polyetherimide must be isolated from the second dispersion before its melting point can be determined. In some embodiments, the isolated semicrystalline polyetherimide exhibits a melting point in a range of 230 to 300° C., as determined according to ASTM D3418-15 by differential scanning calorimetry using a heating rate of 20° C./minute. Within the range of 230 to 300° C., the melting point of the isolated semicrystalline polyetherimide can be in a range of 235 to 280° C., or in a range of 240 to 265° C. In some embodiments, the isolated semicrystalline polyetherimide exhibits an enthalpy of melting in a range of 10 to 40 Joules per gram, or 15 to 35 Joules per gram, determined according to ASTM D3418-15 by differential scanning calorimetry using a heating rate of 20° C./minute. In some embodiments, the isolated semicrystalline polyetherimide exhibits a percent crystallinity of 3 to 15 percent.

The method comprises isolating the semicrystalline polyetherimide from the second dispersion. Suitable isolation methods include filtration, centrifugation, freeze drying, and combinations of at least two of the foregoing. In some embodiments, the isolated semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009. In some embodiments, Dv50 is in a range of 10 to 200 micrometers, or in a range of 10 to 100 micrometers, or in a range of 30 to 95 micrometers, or in a range of 40 to 90 micrometers.

In a very specific embodiment of the method, the amorphous polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009; the $C_1$-$C_6$ alkanol is selected from the group consisting of methanol, ethanol, and combinations thereof; the agitating is conducted for a time of 10 to 200 minutes and at a temperature of 15 to 40° C.; and the isolated semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

Another embodiment is a composition comprising: a polyetherimide comprising etherimide units having the structure

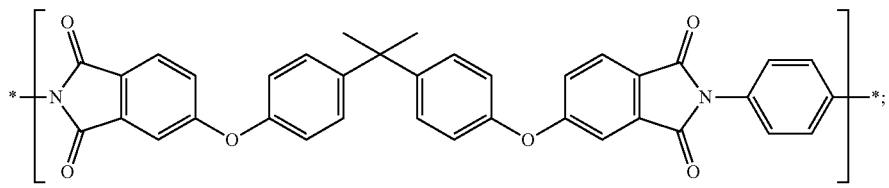

and a solvent mixture comprising dichloromethane and a $C_1$-$C_6$ alkanol; wherein the composition comprises the solvent mixture and the amorphous polyetherimide in a weight ratio of 1:1 to 50:1, respectively; and wherein the solvent mixture comprises the dichloromethane and the $C_1$-$C_6$ alkanol in a weight ratio of 0.5:1 to 15:1, respectively.

In some embodiments of the composition, the polyetherimide is amorphous. In other embodiments, the polyetherimide is semicrystalline. When the polyetherimide is semicrystalline, it can have a percent crystallinity in a range of 0.1 to 15 percent.

All of the variations in the $C_1$-$C_6$ alkanol described above in the context of the method apply as well to the composition. For example, in some embodiments, the $C_1$-$C_6$ alkanol is selected from the group consisting of methanol, ethanol, and combinations thereof.

In a very specific embodiment of the composition, the polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009; the polyetherimide comprises, based on the weight of the amorphous polyetherimide, at least 95 weight percent of the etherimide units having the structure

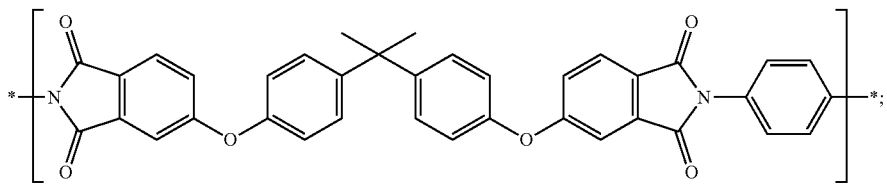

and the $C_1$-$C_6$ alkanol is selected from the group consisting of methanol, ethanol, and combinations thereof.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Materials used in these examples are summarized in Table 1.

TABLE 1

| Material | Description |
| --- | --- |
| PEI | Amorphous poly[2,2-bis(4-(3,4-dicarboxyphenoxy)phenyl)propane)-1,4-phenylene bisimide], CAS Reg. No. 61128-46-9, having a melt flow rate of 20 grams/10 minutes, determined at 360° C. and 5.0 kilogram load. |
| ODCB | ortho-Dichlorobenzene, CAS Reg. No. 95-50-1, purity ≥99.0%; obtained as 1,2-dichlorobenzene from Acros Organics. |
| Acetone | Acetone, CAS Reg. No. 67-64-1, purity ≥99.8%; obtained from Acros Organics. |
| DCM | Dichloromethane, CAS Reg. No. 75-09-2, purity ≥99.8%; obtained from Acros Organics. |
| MeOH | Methanol, CAS Reg. No. 67-56-1, purity ≥99.9%; obtained as methyl alcohol from Acros Organics. |
| EtOH | Ethanol, CAS Reg. No. 67-17-5, purity ≥99.8%; obtained from Fisher Chemical. |
| 1-PrOH | 1-Propanol, CAS Reg. No. 71-23-8, purity ≥99.5%; obtained as propan-1-ol from Acros Organics. |
| 2-PrOH | 2-Propanol, CAS Reg. No. 67-63-0, purity ≥99.5%; obtained as isopropanol from Acros Organics. |
| 1-BuOH | 1-Butanol, CAS Reg. No. 71-36-3, purity ≥99.5%; obtained Acros Organics. |
| 2-BuOH | 2-Butanol, CAS Reg. No. 78-92-2, purity ≥99.5%; obtained as sec-butanol from Acros Organics. |
| AlO | Aluminum oxide surface-treated with trimethoxyoctylsilane, having a particle size of 10-15 nanometers; obtained as AEROXIDE ™ Alu C 805 from Evonik. |
| SiO | Fumed silica surface-treated with 3-(trimethoxysilyl)propyl 2-methyl-2-propenoate, having a particle size of 10-15 nanometers; obtained as AEROSIL ™ R 7200 from Evonik. |

The amorphous polyetherimide, which was initially in pellet form, was ground to achieve a volume-based particle size distribution having a median equivalent spherical diameter (Dv50) of 65-85 micrometers, as determined by laser diffraction according to ISO 13320:2009. Grinding was conducted at −20° C. using a cryogenic grinder.

Comparative Examples 1-6. Crystallization in Ortho-Dichlorobenzene

In Comparative Example 1, amorphous polyetherimide was crystallized in ODCB as follows. Ground amorphous polyetherimide (250 grams) was gradually added to a three liter glass beaker containing ODCB (1250 milliliters) at ambient temperature (23° C.) with stirring by a Silverson L5M high speed mixer at 3500 rotations per minute (rpm). The high-speed mixer's rotor, which forces the mixture through a screen, created extreme agitation that resulted in a finely dispersed mixture without visible agglomerations. After addition of the ground amorphous polyetherimide was complete, the resulting mixture was heated to 140° C. on a hot plate. After 60 minutes of agitation at 140° C., the glass beaker and its contents were removed from the hot plate and left to cool to ambient temperature over the course of about 10 minutes, after which a solid powder (semicrystalline polyetherimide) had settled out of the mixture. The mixture was stirred to disperse the powder, then filtered through an 8 micrometer filter (Whatman 1440-150) using a Buchner funnel and vacuum provided by a water-jet pump. The powder was washed in the Buchner funnel two times with 500 milliliters of acetone. Washing was conducted by adding acetone to the funnel, stirring the resulting mixture until the powder was dispersed, then filtering off the acetone. After the washing steps, the powder was left to dry on air for about four hours in a fume hood, then dried in a vacuum oven for 144 hours at 200° C. to remove residual ODCB and acetone. The following procedure was used to select particles 125 micrometers or smaller. To a Retsch AS200 sieve shaker equipped with 200 by 50 millimeter, 125 micrometer sieve was added 200 grams of powder. The powder was vibrated at 60-65 hertz for five minutes. The yield, calculated as 100×(weight of sieved semicrystalline powder)/(weight of amorphous powder), was 95 percent. The semicrystalline polyetherimide powder was characterized by differential scanning calorimetry (DSC) according to ASTM D3418-15 using a heating rate of 20° C./minute. It exhibited a melting point of 254.46° C. and an enthalpy of melting of 32.06 joules/gram.

In Comparative Examples 2-6, crystallization in ODCB was conducted at 80° C. for times of 1, 2, 3, 4, and 5 hours, respectively. The results of DSC characterization are presented in Table 2. This experiment demonstrates that yields, melting points, and enthalpies of melting are essentially insensitive to crystallization time variations in the range 1-5 hours. The results also show that crystallization at 80° C. yielded a product with a lower melting point (about 248° C.) than crystallization at 140° C. (about 254° C.).

TABLE 2

| | Crystallization Time (h) | Yield (%) | Melting Point (° C.) | Enthalpy of Melting (J/g) | Percent Crystallinity |
|---|---|---|---|---|---|
| C. Ex. 2 | 1 | 95 | 248.16 | 21.71 | 8.79 |
| C. Ex. 3 | 2 | 95 | 248.07 | 21.32 | 8.63 |
| C. Ex. 4 | 3 | 95 | 248.28 | 21.52 | 8.71 |
| C. Ex. 5 | 4 | 95 | 248.42 | 21.53 | 8.72 |
| C. Ex. 6 | 5 | 95 | 248.29 | 21.82 | 8.83 |

Comparative Example 7. Crystallization in Dichloromethane

Ground amorphous polyetherimide (250 grams) was gradually added to a three liter glass beaker containing DCM (1250 milliliters) at ambient temperature (23° C.) with stirring by a Silverson L5M high speed mixer operating at 3500 rpm. During the addition, the amorphous polyetherimide agglomerated, and the stirring speed was increased to 4500 rpm. At this higher stirring speed, the agglomerations broke up, yielding a viscous slurry. After addition of amorphous polyetherimide was complete, the stirring speed was reduced to 3500 rpm, and stirring was continued for about one hour.

An attempt to filter the resulting mixture through an 8 micrometer filter (Whatman 1440-150) using a Buchner funnel and a water jet pump was unsuccessful (no filtrate was observed). The mixture was left on the filter under vacuum in a fume hood for about one hour, resulting in evaporation of most of the DCM and formation of a hard solid. Drying the solid overnight at 100° C. made it even harder. Technically the yield was zero percent because the solid could not be sieved. However, the weight of the recovered hard solid was 50-60% of the weight of the amorphous powder starting material. The hard solid was scraped to provide a powder sample for DSC. The sample exhibited a melting point of 266.53° C. and an enthalpy of melting of 26.53 joules/gram.

Examples 1-3. Crystallization in Dichloromethane/Methanol Mixtures

In these experiments, crystallization was conducted in solvent mixtures having dichloromethane:methanol weight ratios of 50:50, 70:30, and 90:10. For each solvent mixture, ground amorphous polyetherimide (250 grams) was gradually added to a three liter glass beaker containing the solvent mixture (1250 milliliters) at ambient temperature (23° C.) with stirring by a Silverson L5M high speed mixer operating at 3,500 rpm. After stirring for about one hour, the mixture was filtered through an 8 micrometer filter (Whatman 1440-150) using a Buchner funnel and a water-jet pump, yielding a filtrate and a powder cake. It was difficult to filter the mixture with 90:10 DCM/MeOH because the solids were agglomerated, but easy to filter the mixtures with 70:30 and 50:50 DCM/MeOH. For each solvent mixture, the powder cake was left on the filter under vacuum in a fume hood for about one hour, then the powder was dried overnight at 100° C., which was effective to reduce residual dichloromethane to less than 100 parts per million by weight. Yields and DSC results are presented in Table 3. The results show that higher DCM:MeOH ratios are associated with lower yields, higher melting points, and higher enthalpies of melting. Given the low crystallinity of product from 50:50 DCM/MeOH, and the difficulty of filtering the mixture with 90:10 DCM/MeOH, use of 70:30 DCM/MeOH was preferred.

TABLE 3

| | DCM:MeOH ratio | Yield (%) | Melting Point (° C.) | Enthalpy of Melting (J/g) | Percent Crystallinity |
|---|---|---|---|---|---|
| Ex. 1 | 50:50 | 99 | 234.58 | 11.46 | 4.64 |
| Ex. 2 | 70:30 | 99 | 245.87 | 21.46 | 8.69 |
| Ex. 3 | 90:10 | 10 | 260.55 | 28.25 | 11.44 |

Examples 4-8. Crystallization in Dichloromethane/$C_2$-$C_4$ Alkanol 70:30 Mixtures In these experiments, crystallization was conducted in 70:30 (weight/weight) mixtures of dichloromethane and $C_2$-$C_4$ alkanols. The crystallization procedure of Examples 1-3 was followed for each solvent mixture. Due to the small scale of these experiments, yields were not determined. DSC results are presented in Table 4. The results show that melting points and enthalpies of melting were relatively insensitive to alkanol type.

TABLE 4

| | Alkanol | Melting Point (° C.) | Enthalpy of Melting (J/g) | Percent Crystallinity |
|---|---|---|---|---|
| Ex. 4 | ethanol | 248.89 | 19.23 | 7.79 |
| Ex. 5 | 1-propanol | 250.62 | 19.56 | 7.92 |
| Ex. 6 | 2-propanol | 250.49 | 19.20 | 7.77 |
| Ex. 7 | 1-butanol | 248.92 | 20.67 | 8.37 |
| Ex. 8 | 2-butanol | 249.58 | 20.03 | 8.11 |

Examples 9-10. Flow Characterization

The semicrystalline polyetherimide produced in Example 2 was the starting material for these experiments. The semicrystalline polyetherimide was sieved to obtain particles less than or equal to 125 micrometers. The yield for the sieving step was 99%. The material was divided into two parts. The first part, designated Sample A, was used as-is. To the second part was added 0.05 weight percent surface-treated aluminum oxide ("A10" in Table 1), creating a material designated Sample B. Hausner ratio is a measure of flowability, and values greater than 1.25 are considered to indicate poor flowability. For Sample A and Sample B, Hausner ratio and Compressibility were determined at 23° C. according to the following procedure.

1. Use a clean and dry 250 milliliter graduated cylinder (readable to 2 milliliters).
2. Gently introduce, without compacting, approximately 100 grams of the test sample (m) weighed with 0.1 percent accuracy.
3. Carefully level the powder without compacting.
4. Read the unsettled apparent volume ($V_0$) to the nearest graduated unit.
5. Calculate the bulk density in g/mL by the formula $m/V_0$.

6. Mechanically tap the container containing the powder 250 taps from a height of 3.0±0.2 millimeters.
7. Read the final tapped volume ($V_t$) to the nearest graduated unit.
8. Calculate the tapped density (g/mL) using the formula $m/V_t$.
9. Calculate the Hausner Ratio (HR) using the formula $V_0/V_t$.
10. Calculate the Compressibility using the formula $100 \times (V_0-V_t)/V_0$.

The Hausner ratio results in Table 5 indicate that Sample A has a flow character of "Fair" and Sample B has a flow character of "Good".

TABLE 5

|  | Ex. 9 | Ex. 10 |
|---|---|---|
| Sample | A | B |
| Hausner ratio | 1.219 | 1.152 |
| Compressibility (%) | 18.11 | 13.38 |

Examples 11-13. Selective Laser Sintering

In a first experiment, powder flow was determined as a function of bed temperature for semicrystalline polyetherimide powder prepared by solvent-induced crystallization in 70:30 dichloromethane/methanol. As determined by DSC, the powder exhibited an onset temperature of 239° C. and a melting point of 246° C. The selective laser sintering apparatus was obtained from Fraunhofer UMSICHT. Bed temperatures in Table 6 are set temperatures in the laser sintering apparatus. In the Table 6, "●" means that the respective property was good, and "-" means that the property was not determined. In the "Melting" row of Table 6, "small curling" indicates that the set temperature was not appropriate for processing. Collectively, the results demonstrate that as the bed temperature approaches the melting point, the powder can soften and/or become sticky. In general, to avoid curling or sticking of the powder at the platform, the bed temperature should be set at or below the onset temperature of the powder.

TABLE 6

| | bed temp. (° C.) | | | | | | |
|---|---|---|---|---|---|---|---|
| | 150 | 170 | 190 | 210 | 230 | 235 | 238 |
| Flowability | ● | ● | ● | ● | ● | ● | ● |
| Feeding | — | — | — | — | — | ● | ● |
| Melting | — | — | — | — | — | small curling | ● |

Table 7 summarizes powder characteristics and processing parameters used for selective laser sintering (SLS) of three semicrystalline polyetherimides. In Table 7, "$T_m$ (° C.)" is the melting point of the semicrystalline polyetherimide powder; "$T_{bed}$ (° C.)" is the bed temperature used for SLS printing; "Laser Power (W)" is the SLS laser power in watts; and "Density (%)" is the density of laser printed parts expressed as a percent of the density of injection molded parts, where densities of laser printed and injection molded parts were determined by the water-displacement method of Archimedes. The results in Table 7 show that semicrystalline polyetherimides prepared using all three crystallization conditions exhibited good SLS processability.

TABLE 7

|  | Ex. 11 | C. Ex. 8 | C. Ex. 9 |
|---|---|---|---|
| Crystallization conditions | 70:30 DCM/ MeOH, 23° C. | ODCB, 80° C. | ODCB, 140° C. |
| Flow promoter | 0.05% AlO | 0.05% AlO | 0.05% SiO |
| $T_m$ (° C.) | 245 | 248 | 261 |
| $T_{bed}$ (° C.) | 238 | 242 | 240 |
| Laser Power (W) | 28-31 | 28-31 | 36 |
| Density (%_IM) | 90 | 90 | 95 |

Test articles for determination of tensile properties, flexural properties, and notched Izod impact strengths were directly printed by SLS. Tensile properties were determined at 23° C. according to ASTM D638-14 using a test speed of 5 millimeters/minute. Values for tensile strength at break and tensile modulus are expressed in units of megapascals (MPa). Values for tensile elongation at break are expressed in units of percent (%). Notched Izod impact strength values, expressed in units of joules per meter (J/m), were determined at 23° C. according to ASTM D256-10e1 using a pendulum energy of 1 joule. Flexural properties were determined at 23° C. according to ASTM D790-17. Values for flexural strength at break (MPa) and flexural modulus are expressed in units of megapascals (MPa). Values for flexural strain at break are expressed in units of percent. Property values are summarized in Table 8, which also states the crystallization solvent and temperature used to prepare the semicrystalline polyetherimide used for SLS printing of the test articles. The Table 8 results show that similar properties were observed for articles printed from the two semicrystalline polyetherimide powders.

TABLE 8

|  | C. Ex. 10 | Ex. 12 |
|---|---|---|
| Crystallization conditions | ODCB, 80° C. | 70:30 DCM/ MeOH, 23° C. |
| Tensile modulus (MPa) | 1957 | 1949 |
| Tensile strength at break (MPa) | 47.4 | 49.9 |
| Tensile elongation at break (%) | 4.5 | 4.7 |
| Notched Izod impact strength (J/m) | 38.9 | 32.8 |
| Flexural modulus (MPa) | 1830 | 1600 |
| Flexural strength at break (MPa) | 95.7 | 88.5 |
| Flexural strain at break | 7.1 | 6.9 |

The invention includes at least the following aspects.

Aspect 1: A method of forming a semicrystalline polyetherimide, comprising: combining a solvent mixture with an amorphous polyetherimide in a weight ratio of 1:1 to 50:1, respectively, to form a first dispersion; wherein the solvent mixture comprises dichloromethane and a $C_1$-$C_6$ alkanol in a weight ratio of 0.5:1 to 15:1, respectively; and wherein the amorphous polyetherimide comprises etherimide units having the structure

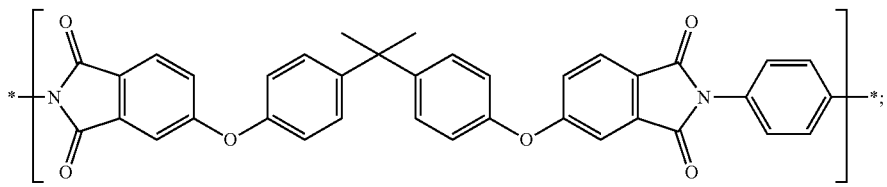

agitating the first dispersion for a time of 5 to 500 minutes and at a temperature of 10 to 50° C. to form a second dispersion comprising a semicrystalline polyetherimide; and isolating the semicrystalline polyetherimide from the second dispersion; wherein the isolated semicrystalline polyetherimide exhibits a melting point in a range of 230 to 300° C., determined according to ASTM D3418-15 by differential scanning calorimetry using a heating rate of 20° C./minute.

Aspect 2: The method of aspect 1, wherein the amorphous polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

Aspect 3: The method of aspect 1 or 2, wherein the agitating comprises stirring at 1500 to 5000 rotations per minute.

Aspect 4: The method of any one of aspects 1-3, wherein the $C_1$-$C_6$ alkanol is selected from the group consisting of methanol, ethanol, isopropanol, and combinations thereof.

Aspect 5: The method of any one of aspects 1-3, wherein the $C_1$-$C_6$ alkanol is selected from the group consisting of methanol, ethanol, and combinations thereof.

Aspect 6: The method of any one of aspects 1-3, wherein the $C_1$-$C_6$ alkanol comprises methanol.

Aspect 7: The method of any one of aspects 1-6, wherein the isolated semicrystalline polyetherimide exhibits an enthalpy of melting in a range of 10 to 40 Joules per gram, determined according to ASTM D3418-15 by differential scanning calorimetry using a heating rate of 20° C./minute.

Aspect 8: The method of any one of aspects 1-7, wherein the agitating is conducted for a time of 10 to 200 minutes and at a temperature of 15 to 40° C.

Aspect 9: The method of any one of aspects 1-8, wherein the isolated semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

Aspect 10: The method of aspect 1, wherein the amorphous polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009; the $C_1$-$C_6$ alkanol is selected from the group consisting of methanol, ethanol, and combinations thereof; the agitating is conducted for a time of 10 to 200 minutes and at a temperature of 15 to 40° C.; and the isolated semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

Aspect 11: A composition comprising: a polyetherimide comprising etherimide units having the structure

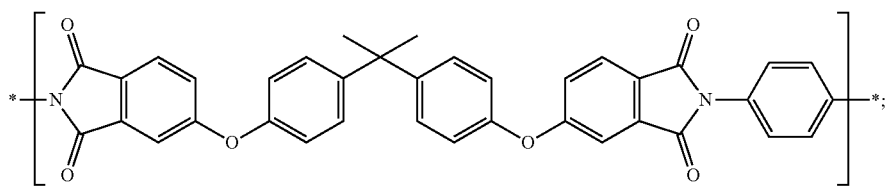

and a solvent mixture comprising dichloromethane and a $C_1$-$C_6$ alkanol; wherein the composition comprises the solvent mixture and the polyetherimide in a weight ratio of 1:1 to 50:1, respectively; and wherein the solvent mixture comprises the dichloromethane and the $C_1$-$C_6$ alkanol in a weight ratio of 0.5:1 to 15:1, respectively.

Aspect 12: The composition of aspect 11, wherein the polyetherimide is amorphous.

Aspect 13: The composition of aspect 11, wherein the polyetherimide is semicrystalline.

Aspect 14: The composition of any one of aspects 11-13, wherein the $C_1$-$C_6$ alkanol is selected from the group consisting of methanol, ethanol, and combinations thereof.

Aspect 15: The composition of aspect 11, wherein the polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009; the polyetherimide comprises, based on the weight of the amorphous polyetherimide, at least 95 weight percent of the etherimide units having the structure

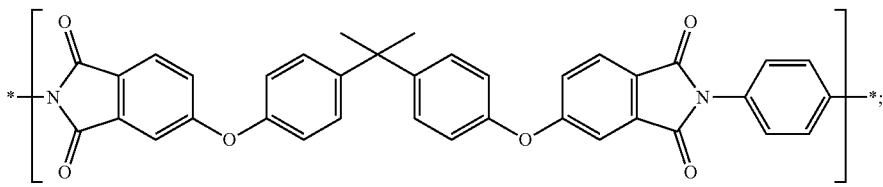

and the $C_1$-$C_6$ alkanol is selected from the group consisting of methanol, ethanol, and combinations thereof.

The invention claimed is:

1. A method of forming a semicrystalline polyetherimide, comprising:
combining a solvent mixture with an amorphous polyetherimide in a weight ratio of 1:1 to 50:1, respectively, to form a first dispersion; wherein the solvent mixture comprises dichloromethane and a $C_1$-$C_6$ alkanol in a weight ratio of 0.5:1 to 15:1, respectively; and wherein the amorphous polyetherimide comprises etherimide units having the structure

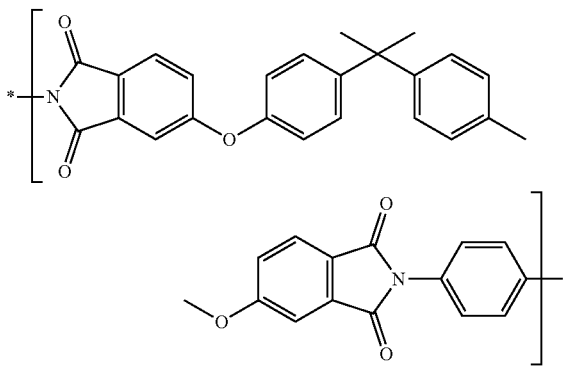

agitating the first dispersion for a time of 5 to 500 minutes and at a temperature of 10 to 50° C. to form a second dispersion comprising a semicrystalline polyetherimide; and
isolating the semicrystalline polyetherimide from the second dispersion; wherein the isolated semicrystalline polyetherimide exhibits a melting point in a range of 230 to 300° C., determined according to ASTM D3418-15 by differential scanning calorimetry using a heating rate of 20° C./minute.

2. The method of claim 1, wherein the amorphous polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

3. The method of claim 1, wherein the agitating comprises stirring at 1500 to 5000 rotations per minute.

4. The method of claim 1, wherein the $C_1$-$C_6$ alkanol is selected from the group consisting of methanol, ethanol, isopropanol, and combinations thereof.

5. The method of claim 1, wherein the $C_1$-$C_6$ alkanol is selected from the group consisting of methanol, ethanol, and combinations thereof.

6. The method of claim 1, wherein the $C_1$-$C_6$ alkanol comprises methanol.

7. The method of claim 1, wherein the isolated semicrystalline polyetherimide exhibits an enthalpy of melting in a range of 10 to 40 Joules per gram, determined according to ASTM D3418-15 by differential scanning calorimetry using a heating rate of 20° C./minute.

8. The method of claim 1, wherein the agitating is conducted for a time of 10 to 200 minutes and at a temperature of 15 to 40° C.

9. The method of claim 1, wherein the isolated semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

10. The method of claim 1, wherein
the amorphous polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009;
the $C_1$-$C_6$ alkanol is selected from the group consisting of methanol, ethanol, and combinations thereof;
the agitating is conducted for a time of 10 to 200 minutes and at a temperature of 15 to 40° C.; and
the isolated semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009.

11. A composition comprising:
a semicrystalline polyetherimide comprising etherimide units having the structure

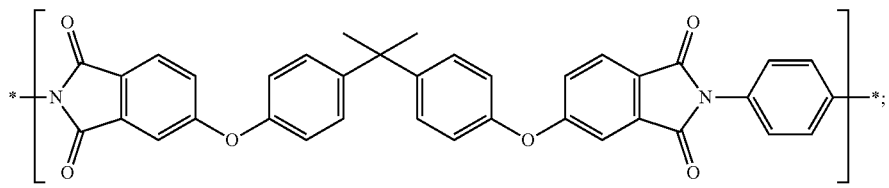

and
  a solvent mixture comprising dichloromethane and a $C_1$-$C_6$ alkanol;
  wherein the composition comprises the solvent mixture and the semicrystalline polyetherimide in a weight ratio of 1:1 to 50:1, respectively;
  wherein the solvent mixture comprises the dichloromethane and the $C_1$-$C_6$ alkanol in a weight ratio of 0.5:1 to 15:1, respectively, and
  wherein the semicrystalline polyetherimide exhibits a melting point in a range of 230 to 300° C., determined according to ASTM D3418-15 by differential scanning calorimetry using a heating rate of 20° C./minute.

12. The composition of claim 11, wherein the $C_1$-$C_6$ alkanol is selected from the group consisting of methanol, ethanol, and combinations thereof.

13. The composition of claim 11, wherein
  the semicrystalline polyetherimide is in the form of particles having a Dv50 value in a range of 10 to 400 micrometers, wherein Dv50 is defined as the median equivalent spherical diameter of a volume-based particle size distribution, as determined by laser diffraction according to ISO 13320:2009;
  the semicrystalline polyetherimide comprises, based on the weight of the semicrystalline polyetherimide, at least 95 weight percent of the etherimide units having the structure

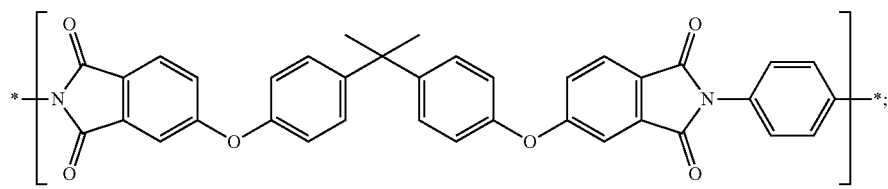

and
  the $C_1$-$C_6$ alkanol is selected from the group consisting of methanol, ethanol, and combinations thereof.

* * * * *